Patented Jan. 22, 1946

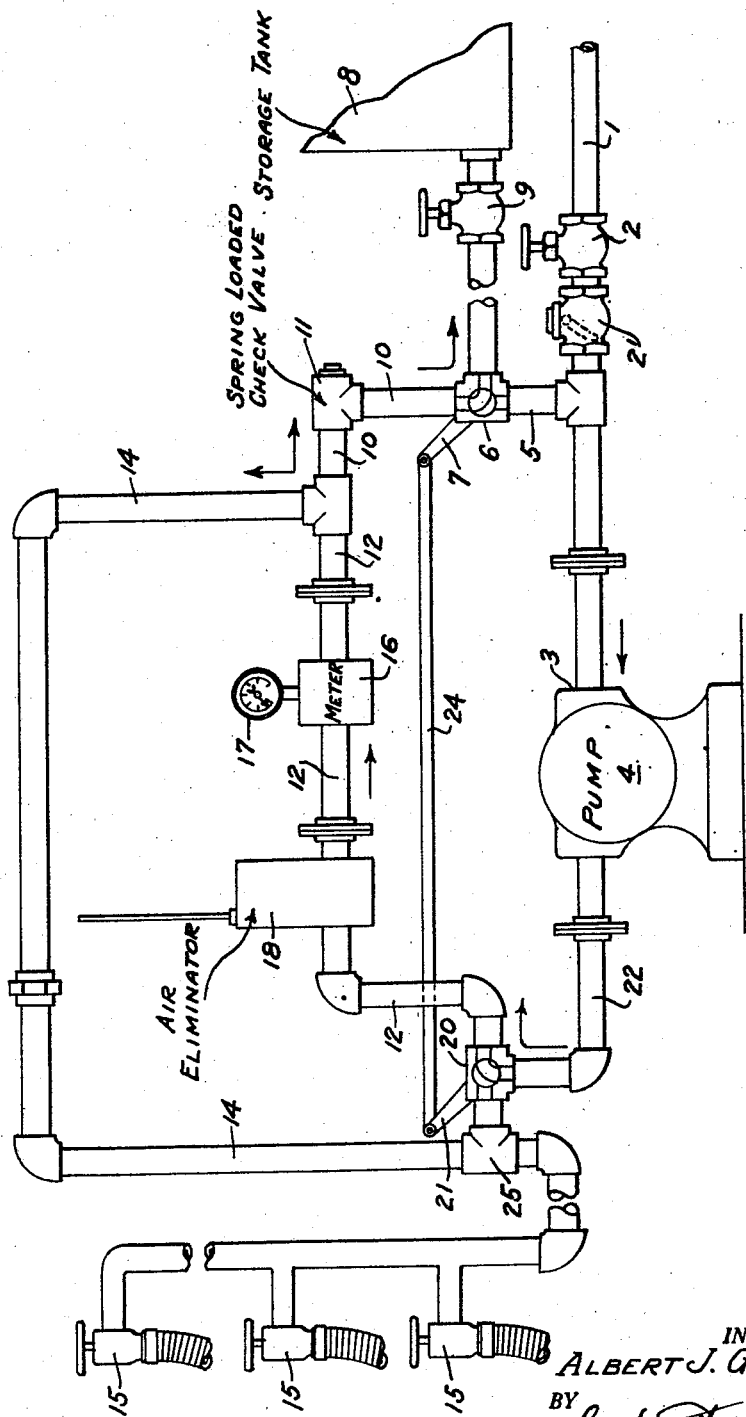

2,393,464

UNITED STATES PATENT OFFICE 2,393,464

BULK PLANT RECEIVING RECORDER

Albert J. Granberg, Emeryville, Calif.

Application February 17, 1942, Serial No. 431,239

1 Claim. (Cl. 137—78)

My invention relates to a bulk plant receiving recorder for liquids, and more particularly to such a system wherein liquid delivered to the plant can be accurately recorded and thereafter stored and simultaneously dispensed.

The term bulk plant is defined herein as a plant having extensive facilities for storage of liquids such as gasoline, fuel oil, lubricating oil and the like, together with means for loading liquids into transporting means, such as, for example, tank trucks. Such bulk plants may be supplied with liquid from tank trucks or tank cars.

It is highly desirable that loading be carried on during delivery of liquid to the bulk plant. Under these conditions there are two paths for the liquid to travel, one path leads into a storage tank, and one path leads into the tank to be loaded.

Under these circumstances if liquid is taken only from the storage tank while the tanks to be loaded are being filled, time is lost. Likewise, if the storage tank is filled, without loading the outgoing tanks, then time is also lost. It is the main object of the present invention to provide a system which will permit incoming liquids to travel simultaneously in two directions, i. e., to the tanks to be loaded, and if these tanks do not take all of the liquid which is being unloaded, the remainder may be passed to the storage tank. A further object of my invention is to provide a single meter strategically positioned, so that the volume of liquid being unloaded is accurately recorded, irrespective of whether it goes to the tanks being loaded, or to the storage tank. A third object of the invention is to provide a system wherein a single pump may be utilized, not only for the simultaneous storage and unloading of liquid, but also for direct use in loading tanks from the storage tank when no liquid is being unloaded.

Other objects of my invention will be apparent or will be specifically pointed out in the description forming a part of this specification, but I do not limit myself to the embodiment of the invention herein described, as various forms may be adopted within the scope of the claim.

The drawing shows a piping diagram of a system operating in accordance with my invention, where liquid can be received, and thereafter simultaneously delivered, if desired, to both a storage tank and an outgoing delivery system so that a single record can be made of all incoming liquid.

My invention may be more properly understood by direct reference to the drawing.

An inlet pipe 1 is provided, this pipe being under the control of a valve 2. Inlet pipe 1 comes directly from the container of the incoming liquid, such as, for example, a tank car or large tank truck. Inlet pipe 1 then leads through a check valve 2' to the inlet side 3 of a pump 4, this pump being of a type capable of handling such liquids as gasoline, fuel-oil, kerosene, lubricating oil and the like. Between pump 4 and valve 2, a branch line 5 connects with line 1 and leads to a two-way tank valve 6. This valve is operated by an arm 7, and in the position shown in the drawing, connects a storage tank 8 through a storage tank valve 9 to a tank line 10. Tank line 10 then passes through a spring loaded check-valve 11, which allows passage of liquid toward tank 8 only when a certain pressure has been reached, this pressure varying in accordance with individual bulk plant installations, as will be pointed out later. Tank line 10 then divides into a meter line 12 and a delivery line 14.

Delivery line 14 then is connected with a plurality of delivery valves 15, through which liquids may be delivered at a loading platform, for example, into tank trucks for delivery away from the plant. Meter line 12 then is connected with a meter 16, the meter being of any conventional type for metering liquids handled by the plant, this meter having a registering dial 17.

After the meter pipe line 12 has passed through the meter, it passes through an air eliminator 18 also of any conventional type operating to remove air from liquids, as is customary in metering fuels of various types. Meter line 12, after passing through the air eliminator 18, then passes through a second two-way valve 20, operated by arm 21. In the drawing this valve is shown as connecting pump output line 22 to meter line 12. The other side of valve 20 connects to delivery line 14 through fitting 25. Two-way valve arm 7 is connected to the second two-way valve arm 21 by an operating link 24 so that the two valves can be operated in unison.

Assuming that the bulk plant is busy at all times and that at least sufficient liquid is stored in storage tank 8 to supply delivery requirements, through delivery valves 15, but is not full, a tank truck or car arrives with liquid to be stored in the tank 8. Under these circumstances, as has been pointed out above, it is desirable to unload the arriving tank without disturbing deliveries through delivery valves 15. Yet, at the same time, it is highly important to meter the total liquid entering the bulk plant. Under these circumstances, the two-way valves 6 and 20 are set for unloading of the arriving tank as shown in the drawing. Under these conditions, valve 2 is opened, and unloading pipe 1 is inserted into the arriving tank. Pump 4 is started. Liquid is pumped from the arriving tank through line 1, pump 4 and pump delivery line 22, then through second two-way valve 20, through the air eliminator 18, through meter 16, until the liquid reaches the point where delivery pipe 14 joins meter pipe 12. If there is a free outlet for all of the liquid through delivery line 14, all of the liquid being pumped will pass into this delivery pipe and be delivered to the outgoing tank trucks through valves 15. If, however, and as is much more likely, there will be an excess of incoming liquid forced by pump 4 through the meter 16 and into the meter line 12, the pressure will then open the spring loaded check-valve 11 to permit the excess liquid to pass through storage line 10, first two-way valve 6 and into the storage tank 8.

The liquid under these circumstances will always be properly divided, all the liquid going into the storage tank if none of the valves 15 are open, or the liquid will be delivered both to the storage tank and to the valves 15, if the valves 15 are not taking all of the liquid. Only one meter is utilized. This meter registers all of the liquid entering the bulk plant irrespective of whether it is stored, or immediately delivered through the output valves of the plant.

The tie bar or link operating the valves is so arranged that the meter cannot be operated except when liquid is being received or pumped into the plant.

After the incoming tank trucks have been emptied it will then be necessary for the loading platform valves 15 to continue in operation. Under these circumstances, valves 6 and 20 are simultaneously moved to their opposite positions by means of bar 24. Under these conditions, the storage tank 8 is connected directly with the delivery valves 15, as follows—from storage tank 8 to storage tank valve 9, then through first two-way valve 6, through pipe 5 to pump inlet pipe 1. Liquid is prevented from passing outwardly toward the open end of pipe 1 first by the check-valve 2', and then by the fact that under these conditions valve 2 will be closed. Liquid from storage tank 8 will then pass through pump 4 into pump outlet line 22, then through valve 20 into delivery pipe 14 and then to the delivery valves 15.

It will be noted that with valves 6 and 20 in this latter position, that the meter pipe 12 is closed at two points, namely at the valves 6 and 20, and thereby the portion of delivery pipe 14 connecting meter pipe 12 to fitting 25 is dead-ended. Consequently, there is no circulation through the meter 16 and the meter does not operate. Measuring of the outgoing liquid under these circumstances may be performed in the customary manner.

The main object of the present invention is therefore accomplished. All liquid entering the above plant is metered particularly when, during such entrance, alternate paths are provided for the liquid. Under these circumstances, the amount of liquid received can be accurately and closely checked, irrespective of where the liquid goes, and in conjunction with the usual method of keeping track of outgoing liquid, the operator of the bulk plant knows exactly the receipts at all times.

In contrast, the customary check on liquids delivered to bulk plants from tank cars or tank transports is usually performed by dropping a tapeline inside of the storage tanks, in order to measure the height of liquid within the tanks before and after unloading. This system makes it difficult to keep an accurate record of the amount received, because as has been above stated, it is often necessary to load outgoing trucks at the same time liquids are being unloaded into the plant.

While I have described my preferred system as embodying a pump, I wish it to be understood that gravity distribution is deemed a full equivalent.

I claim:

A liquid storage and transfer system comprising pumping means having a supply conduit provided with a shutoff valve, and a delivery conduit, a valved dispensing means, a meter, a conduit connected to the meter inlet, a conduit connected to the meter outlet, a first flow conduit means establishing a first flow path from the pump and delivery conduit to the meter inlet conduit and a second flow path from the pump and delivery conduit to the dispensing conduit, a first two-way valve constructed and arranged to have a first position in which flow is had through the first path to the exclusion of the second path and a second position in which flow is had through the second path to the exclusion of the first path, a second flow conduit means establishing a first path of flow from the meter and meter outlet conduit to the storage means and a second path from the storage means to a point in the supply conduit between the pump and the said shutoff valve, a second two-way valve constructed and arranged to have a first position in which flow is had through the first path to the exclusion of the second path and a second position in which flow is had through the second path to the exclusion of the first path, a spring biased check valve located between the outlet of the meter and the second two-way valve constructed and arranged so as to close against flow from the meter and to open when the pressure in the meter delivery conduit exceeds a predetermined value, a third conduit means extending from the meter conduit at a point between the meter and the check valve to the dispensing conduit, and means for connecting the two-way valves for simultaneous operation so that both will be in the first position or the second position, the entire arrangement being such that all liquid delivered through the shut-off valve will be metered and delivered to the dispensing means and/or storage means and such that liquid delivered to the dispensing means from the storage means will be unmetered.

ALBERT J. GRANBERG.